(No Model.) 3 Sheets—Sheet 1.
J. W. HOGELAND.
HAY LOADER.
No. 355,991. Patented Jan. 11, 1887.
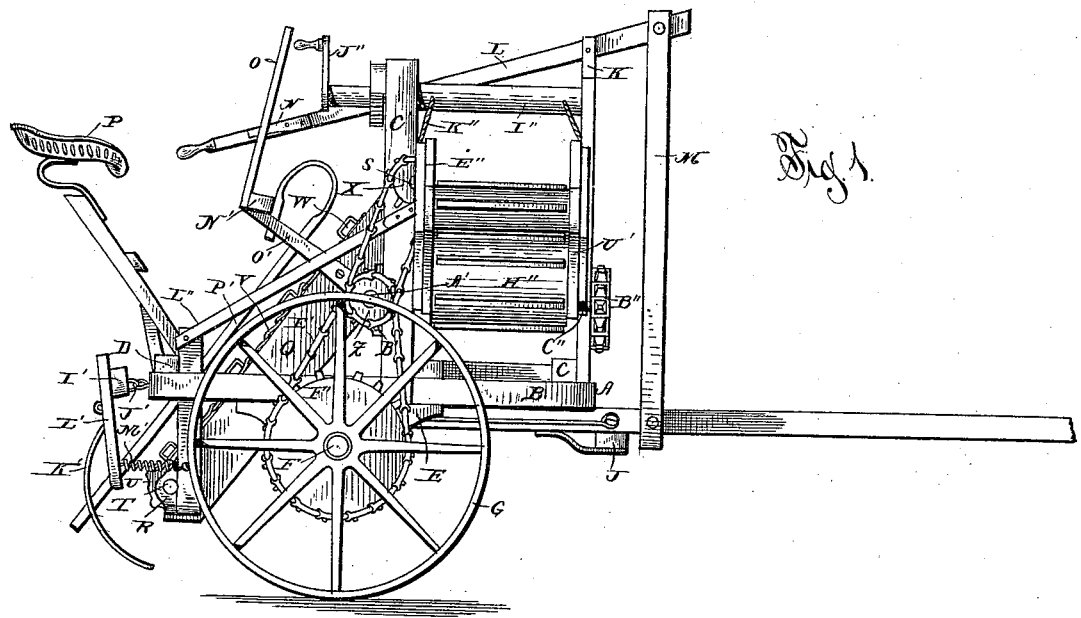
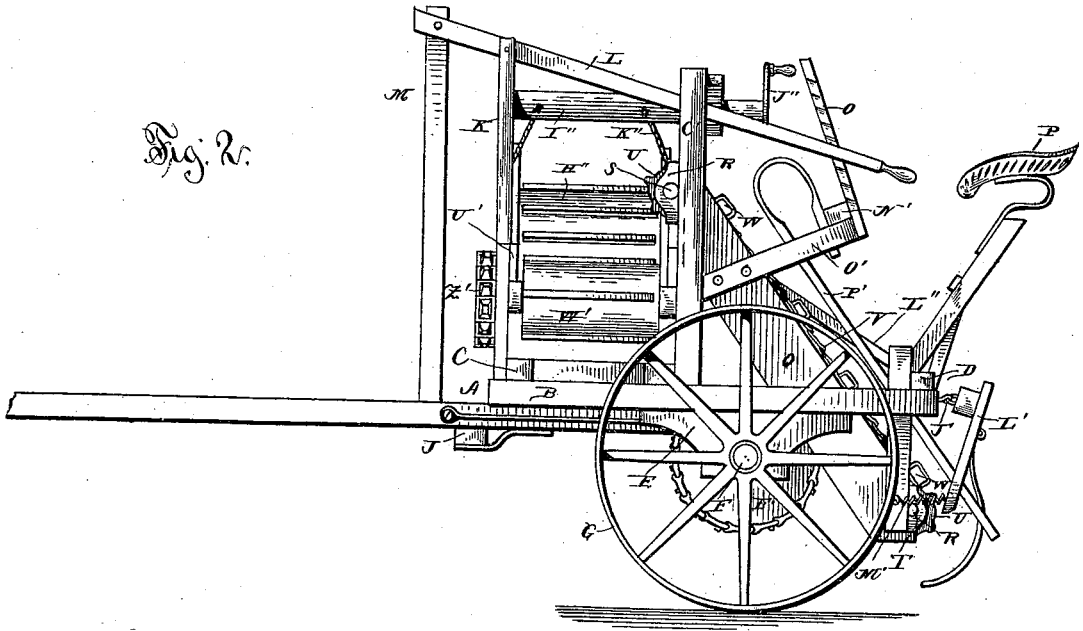
WITNESSES
F. L. Ourand.
Edward Stanton
INVENTOR
John W. Hogeland
By Louis Bagger & Co.
Attorneys.

(No Model.) 3 Sheets—Sheet 2.

J. W. HOGELAND.
HAY LOADER.

No. 355,991. Patented Jan. 11, 1887.

WITNESSES
F. L. Ourand
Edward Stanton

INVENTOR
John W. Hogeland
By Louis Bagger & Co.
Attorneys.

(No Model.) 3 Sheets—Sheet 3.

J. W. HOGELAND.
HAY LOADER.

No. 355,991. Patented Jan. 11, 1887.

WITNESSES
F. L. Ourand
Edward Stanton

INVENTOR
John W. Hogeland
By Louis Bagger & Co.
Attorneys.

N. PETERS, Photo-Lithographer, Washington, D. C.

UNITED STATES PATENT OFFICE.

JOHN WILLIAM HOGELAND, OF LOVILIA, IOWA.

HAY-LOADER.

SPECIFICATION forming part of Letters Patent No. 355,991, dated January 11, 1887.

Application filed April 12, 1886. Serial No. 198,552. (No model.)

*To all whom it may concern:*

Be it known that I, JOHN WILLIAM HOGELAND, a citizen of the United States, and a resident of Lovilia, in the county of Monroe and State of Iowa, have invented certain new and useful Improvements in Hay-Loaders; and I do hereby declare that the following is a full, clear, and exact description of the invention, which will enable others skilled in the art to which it appertains to make and use the same, reference being had to the accompanying drawings, which form a part of this specification, and in which—

Figure 3:
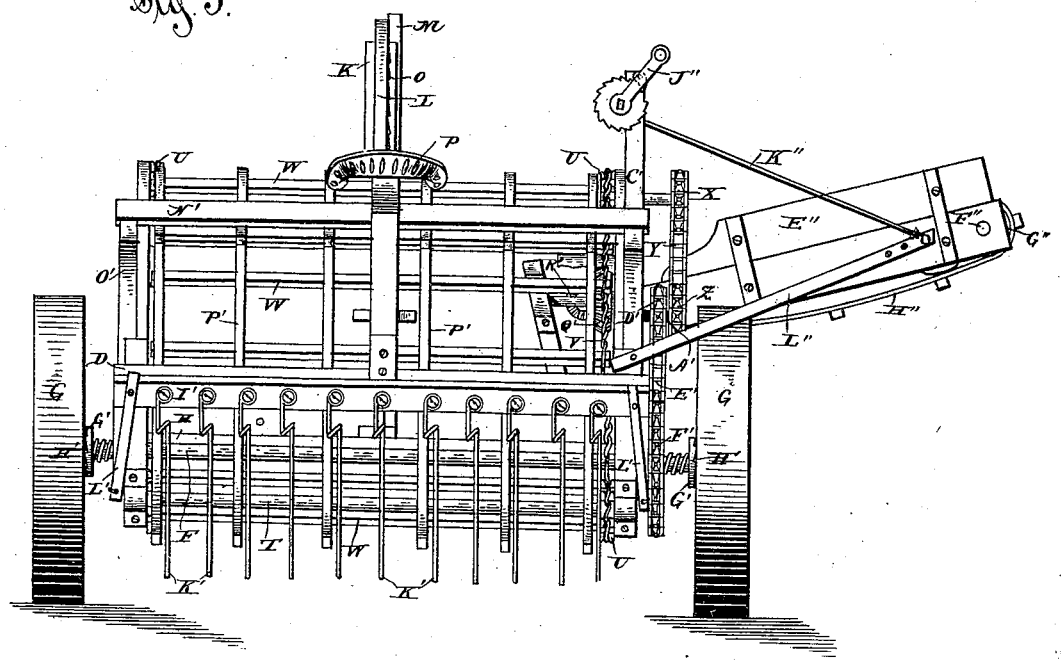
Figure 4:
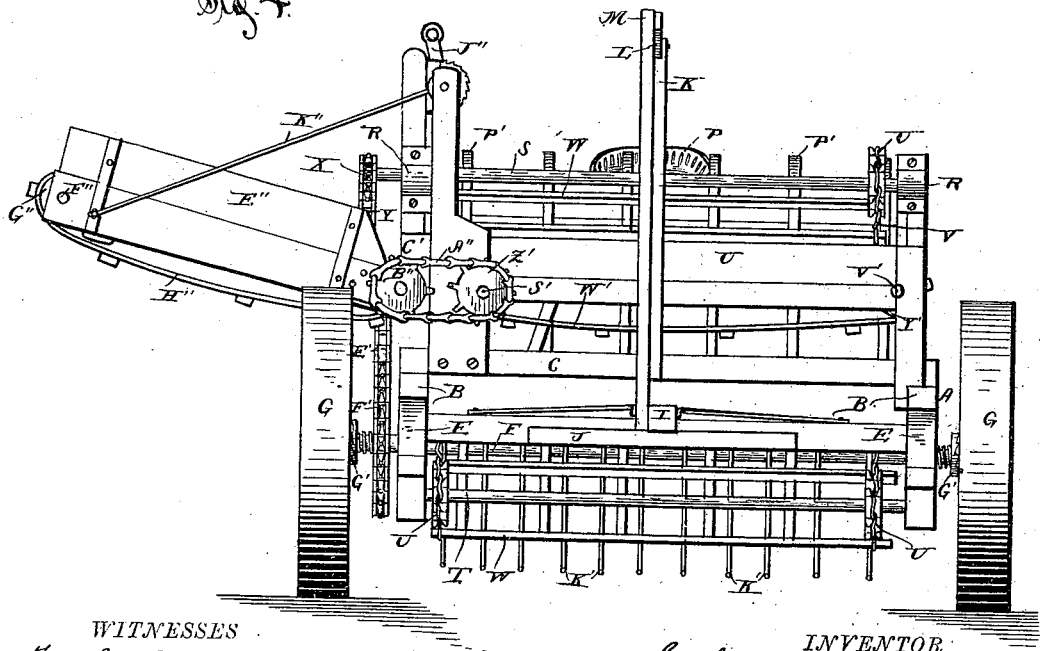
Figure 5:
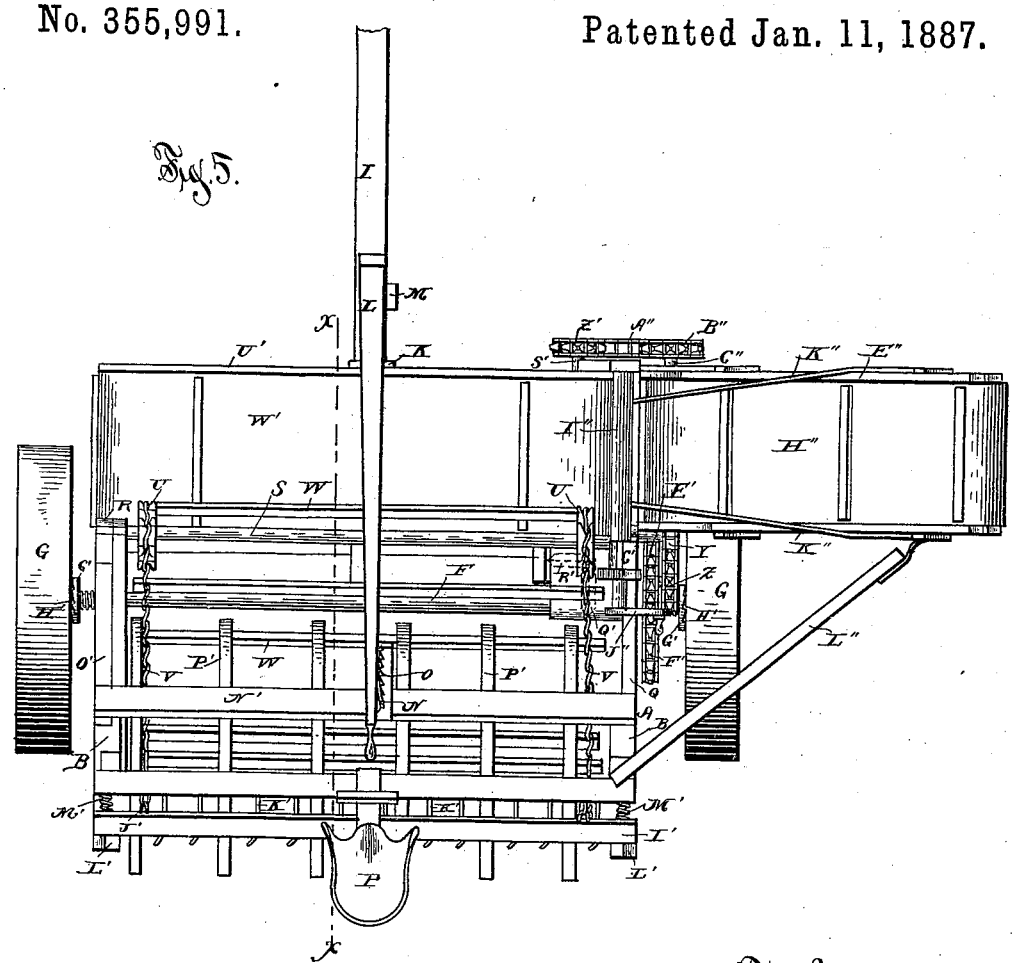
Figure 6:
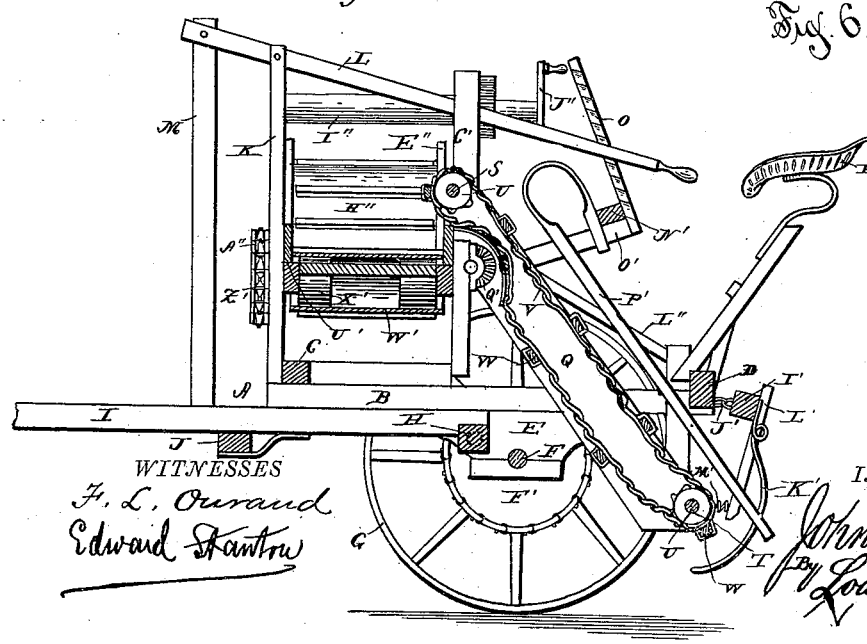

Figure 1 is a side view of my improved hay-loader. Fig. 2 is a similar view seen from the other side. Fig. 3 is a rear view. Fig. 4 is a front view. Fig. 5 is a top view. Fig. 6 is a longitudinal vertical sectional view on line $x\ x$, Fig. 5.

Similar letters of reference indicate corresponding parts in all the figures.

My invention has relation to that class of hay-loaders which rake the hay from the field and convey it to a wagon; and it consists in the improved construction and combination of parts of a hay-loader in which the hay is raked from the field and conveyed to a wagon, which is drawn at the side of the loader, so as to admit of the loader being entirely independent of the wagon to be loaded, as hereinafter more fully described and claimed.

In the accompanying drawings, the letter A indicates a frame, which consists of two side pieces, B B, and a forward end piece, C, and a rear end piece, D. The side pieces of the frame are provided at their middles with bearings E E, in which a shaft, F, is journaled, and this shaft has two drive-wheels, G G, secured to its ends. A cross-piece, H, is journaled with its ends in the side pieces of the frame forward of the shaft, and the tongue I is secured to the middle of this cross-piece with its rear end, and has the double-tree J pivoted upon it. An upright, K, projects from the middle of the forward end piece, and a lever, L, is pivoted upon the upper end of this upright, and has a connecting-rod, M, pivoted to its forward end, the lower end of which connecting-rod is pivoted to the tongue. The rear end of the lever is provided with a suitable spring-latch, N, which may engage notches in an upright, O, at the rear end of the machine, and the rear end of the lever is within easy reach of the driver, whose seat P is supported upon the middle of the rear end piece of the frame.

Two rearwardly and downwardly inclined frame-pieces, Q Q, are secured in the frame, and are formed with bearings R R at their ends, and shafts S and T are journaled with their ends respectively in the upper and lower bearings of the frame-pieces, and are provided with chain-wheels U inside of the bearings. Chains V pass over these chain-wheels, and these chains are formed with rectangular links, in which the ends of transverse slats W are secured, the chains and slats forming an endless slat apron. One end of the upper shaft is provided, outside of the bearing, with a sprocket-wheel, X, over which passes a chain, Y, which passes under a sprocket-wheel, Z, secured upon the end of a short shaft, A', journaled in a bearing, B', in one of two uprights, C' C', upon the forward portion of the side piece of the frame, and this shaft is, furthermore, provided with a sprocket-wheel, D', over which passes a chain, E', which passes under a large sprocket-wheel, F', secured upon the drive-shaft.

Clutches G' G' are secured to the ends of the shaft inside of the wheels, and the wheels, which revolve upon the shaft, are provided with clutches H' H' upon the inner ends of their hubs, engaging the spring-clutches, so that the wheels will revolve the shaft when revolved forward, but will revolve upon the shaft when revolved backward, and so that the clutches may be moved out of engagement with the wheels when the machine is to be transported from one place to another.

The rake-head I' is secured by means of links J' to the rear end piece of the frame, and has the curved spring-teeth K' of any desired construction secured to it, the spring-teeth curving around the lower end of the inclined endless slat apron, and the ends of the rake-heads are provided with downwardly-projecting arms L' L', which have springs M' M' secured to their lower ends and to the lower ends of the inclined frame-pieces of the apron, so that the entire rake may yield to any obstruction which it may strike, or to any excess of hay which may be raked up and transferred to the apron.

A cross-piece, N', is supported across the upper portion of the apron-frame, being supported from the frame-pieces by means of arms O' O', and the upper upwardly and rearwardly curved ends of yielding slats P' P' are secured to the under side of this cross-piece, having their lower rear ends projecting above the slat apron and out through the spaces between the rake-teeth, the slats serving to prevent the hay from blowing off the apron in windy weather and to force the hay against the apron, so that it will carry the hay with it.

The short shaft A' is provided with a beveled cog-wheel, Q', which meshes with a beveled pinion, R', and this pinion is secured upon the rear end of a shaft, S', journaled in bearings T' at the end of a transverse frame, U', secured across the forward end of the frame. Another shaft, V', is journaled in the other end of this frame, and an endless carrier-apron, W', travels over rollers X' and Y' upon these shafts, receiving the hay from the slat apron. The shaft having the beveled pinion is provided at its forward end with a sprocket-wheel, Z', over which passes a sprocket-chain, A'', which passes over a sprocket-wheel, B'', secured upon the forward end of a roller-shaft, C'', which is journaled in bearings D'' in the inner end of a frame, E'', hinged at its inner end to the end of the other transverse frame. The outer end of this hinged frame is provided with a shaft, F'', having a roller, G'', and a carrier-apron, H'', passes over the rollers at the ends of the frame, receiving the hay from the other transverse apron and carrying it out to its end.

A windlass, I'', is journaled in bearings upon the uprights C C', and is provided with a crank, J'', at its rear end and with a suitable stop, and ropes or chains K'' K'' pass from near the outer end of the hinged frame to the windlass, winding upon the same, so that by revolving the windlass the hinged frame may be raised or lowered.

An oblique brace, L'', is secured to the outer end of the rear edge of the hinged frame, and is hinged at its rear end to the rear portion of the machine-frame.

It will now be seen that the machine may be propelled across the field with the wagon at its side, and the hay will be taken up by the rake and transferred to the slat apron, which carries it to the upper portion of the machine, where it drops upon the transverse apron, which transports it across the machine to the hinged frame, in which the endless apron will carry the hay to the wagon, the hinged frame being capable of being raised or lowered by means of the windlass according to the height of the load upon the wagon.

By having the loader propelled by its own individual team in place of hitching the loader to the rear end of the wagon, the loader may be made as wide as desired, enabling it to load a greater quantity of hay than a loader which is attached to the rear end of a wagon, and which consequently can only be of the same width as the wagon, and as soon as a wagon is loaded it may be drawn away from the loader and another wagon may be driven up to the side of the loader without the consumption of time for unhitching the loader from the wagon and hitching it to the empty wagon. As the loader is at the side of the wagon, the hay may be delivered at any point of the wagon, so that the labor of distributing the hay upon the wagon will not be so severe as it is in a loader loading from the rear of the wagon, where all the hay falling at the rear end of the wagon will have to be brought forward in the wagon, while in this loader the loader may be driven at the side of the forward, middle, or rear end of the wagon, and may deliver the hay at any part of the wagon desired.

Having thus described my invention, I claim and desire to secure by Letters Patent of the United States—

The combination of the wheeled frame A, rake-head I', with its spring-teeth K', the springs M', the elevator secured by its side pieces, Q, in the rear end of the frame and provided with shafts S and T, carrying sprocket-wheels U and X, over which passes an endless slat apron composed of chains B and slats W, the series of spring-slats P', secured to the cross-piece N', the horizontal carrier secured between posts on the front end of said frame, provided with rollers X' Y', and the endless apron W, the side elevator connected to the frame at one end of the horizontal carrier, provided with the roller-bearing shafts C'' and G'', and carrier-apron H'', the windlass I'' and ropes K'', the sprocket-wheels F', secured to the shaft of the frame-wheels G, sprocket-wheel Z, the chain E', passing around said sprocket-wheels, the sprocket-wheel X and chain Y, the bevel-gear Q' and R', the sprocket-wheels Z' and B'', and the chain A'', and the tilting mechanism composed of upright M, lever L, spring-catch N, and rack O, all to operate as and for the purpose set forth.

In testimony that I claim the foregoing as my own I have hereunto affixed my signature in presence of two witnesses.

JOHN WILLIAM HOGELAND.

Witnesses:
J. S. HOGELAND,
F. H. BARNES.